Patented Oct. 4, 1949

2,483,892

UNITED STATES PATENT OFFICE 2,483,892

PROCESS FOR THE MANUFACTURE OF CHLORAMPHENICOL

John Ehrlich, Detroit, Robert M. Smith, East Detroit, and Mildred A. Penner, Detroit, Mich., assignors to Parke, Davis & Company, Detroit, Mich., a corporation of Michigan No Drawing. Application March 16, 1948, Serial No. 15,255

13 Claims. (Cl. 195—80)

The invention relates to methods for cultivation of certain micro-organisms on a commercial scale in order to produce antibiotics. More particularly the invention relates to the cultivation of Streptomyces venezuelae.

It has recently been discovered that a very valuable antibiotic may be obtained from cultures of Streptomyces venezuelae and a name, chloramphenicol has arbitrarily been used to designate this antibiotic compound. The compound has been found to have the chemical structure corresponding to the name (1)-$\psi$-1-p-nitrophenyl-2-dichloroacetamidopropane-1,3-diol.

The object of the present invention is to provide methods for producing culture liquids or beers containing chloramphenicol in such form and in such abundance that the antibiotic may be obtained therefrom on a scale suitable for the commercial production of said antibiotic. To this end the invention consists in the novel methods hereinafter more fully set forth.

Streptomyces venezuelae occurs inter alia in soils. Generically, it is an Actinomycete which is characterized by branched slender mycelium rarely or not septate, aerial hypae giving rise endogenously to chains of unicellular spores not normally fragmenting as oidia, unbranched sporophores and spore chains. Specifically, it is a Streptomyces which liquifies gelatin, peptonizes litmus milk, reduces nitrates to nitrites, utilizes inorganic and organic nitrogen sources including nitrites, nitrates, ammonium salts, amides, amino acids, amines, peptides and peptones, produces hydrogen sulfide, hydrolyzes starch, produces a dark brown soluble pigment on organic media, readily utilizes numerous carbon sources including arabinose, dextrose, galactose, glycerol, lactose, levulose, maltose, rhamnose, salicin, starch and succinic acid, and poorly utilizes dulcitol, inositol, mannitol, sorbitol, sucrose, acetic acid, citric acid, formic acid, oxalic acid, salicylic acid and tartaric acid.

A complete description of Streptomyces venezuelae has been published in Journal of Bacteriology, vol. 56, pages 467–477, October 1948.

Cultures of this organism may be obtained by mixing cultures of the specific bacteria inhibited by the micro-organism with aqueous agar and adding a soil containing the desired Streptomyces venezuelae. After incubating the mixture for one to ten days colonies of the desired Actinomycete and other antagonists appear. The Streptomyces venezuelae growths are selected, transferred to a fresh nutrient medium and later isolated as a pure culture in accordance with the conventional procedures.

A pure culture of Streptomyces venezuelae has been filed with the Parke, Davis & Company Culture Bureau, Detroit, Michigan, under No. 04745 and a pure culture has also been filed with the American Type Culture Collection, Washington, D. C., under No. 10712.

Chloramphenicol has the chemical structure corresponding to the name (1)-$\psi$-1-p-nitrophenyl-2-dichloroacetamidopropane-1,3-diol. It can be isolated from the culture liquids produced in accordance with the present invention by methods described and claimed in the copending application of Bartz Serial No. 15,256, filed March 16, 1948.

Chloramphenicol may not only be manufactured by microbiological methods as herein set forth, but it may also be manufactured by synthetic methods. In the copending application of Crooks et al. Serial No. 15,264, filed March 16, 1948, and in other copending applications of Crooks et al. Serial Nos. 76,172 to 76,180 inclusive, all filed February 12, 1949 as continuations-in-part of said application Serial No. 15,264, certain synthetic methods are described which can be used for the manufacture of chloramphenicol. (1)-$\psi$-1-p-nitrophenyl-2-dichloroacetamidopropane-1,3-diol is claimed in application Serial No. 76,179.

In practicing the present invention, the cultivation of Streptomyces venezuelae may be carried out in a number of different ways. For example, the micro-organism may be cultivated under aerobic conditions on the surface of the medium or it may be cultivated beneath the surface of the medium, i. e. in the submerged condition, if oxygen is simultaneously supplied.

Briefly stated, the production of chloramphenicol by the surface culture method involves inoculating a shallow layer, usually less than about 2 cm., of a sterile, aqueous nutrient medium with Streptomyces venezuelae and incubating the mixture under aerobic conditions at a temperature between about 20 and 40° C., preferably at room temperature (about 25° C.), for a period of about ten to fifteen days. The mycelium is then removed from the liquid and the culture liquid is then treated by the methods hereinafter described for isolating therefrom the desired chloramphenicol.

The preferred method for practicing this invention on a large scale involves the use of submerged or deep cultures of the organism. According to this method a sterile, aqueous nutrient medium is inoculated with Streptomyces venezuelae and incubated with agitation and aeration at a temperature of about 20 to 40° C., preferably in the neighborhood of 25° C. for about two to seven days. Under these conditions the organism develops as numerous more or less discrete particles dispersed throughout the medium in contrast to the more or less continuous pellicle present on the surface of the medium in the surface culture method. By virtue of this distribution of the organism throughout the medium, large volumes of the inoculated nutrient medium can be cultivated at one time in the large tanks and vats customarily employed in the fermentation industry. Stationary vat fermenters equipped with suitable agitation and aeration devices as well as horizontal rotary drum fermenters have been found to be particularly useful in this respect. However, for the preparation of smaller quantities of the antibiotic or of cultures of the micro-organism this submerged culture method may be carried out in small flasks which are either shaken or stirred by suitable mechanical means.

Agitation and aeration of the culture mixture may be accomplished in a number of ways. Agitation may be provided by a propeller, or similar mechanical agitation device, by revolving or shaking the fermenter itself, by various pumping devices, or by the passage of air or other oxygen-containing gases through the medium. Aeration may be effected by injecting air, or other oxygen-containing gases, into the fermentation mixture through open pipes, perforated pipes, porous diffusion media such as carbon sticks, carborundum, sintered glass and the like, or it may be provided by spraying, splashing or spilling the mash into or through an oxygen-containing atmosphere.

A wide variety of nutrient media may be used in the growing stage of the process. However, it has been found that the best results are obtained when an aqueous medium containing an assimilable carbon source and a proteinaceous material is employed. Assimilable carbon source is here understood to include polyhydric alcohols and mono-, di-, and poly-saccharides while the term proteinaceous material includes unmodified protein and protein degradation products, particularly such products as arise from the hydrolysis of proteins. These protein degradation products includes proteoses, peptones, polypeptides, peptides and amino acids.

As assimilable carbon sources glycerol, galactose, xylose, arabinose, rhamnose, glucose, fructose, sucrose, lactose, maltose, inulin, dextrins and starches may be mentioned. These carbon sources may be supplied to the medium in purified form or in the form of concentrates. Thus lactose may be supplied either as the purified sugar or as whey or whey concentrates. Starch may be supplied as unmodified starch, or as high fluidity (acid modified) starch or it may be subjected to the action of acid or of liquefying enzymes in the cource of the preparation of the medium. Sucrose, although it is not one of the better carbon sources, may be used in the form of purified sugar or as cane or beet molasses. Since glucose is a normal component of corn steeping liquor it may be supplied in this fashion or as the purified sugar or corn syrup. Grain mashes, such as corn, wheat or barley mash, either malted or unmalted, may be used also. Such mashes are particularly suitable because they provide at a low cost not only starch and dextrins, but also an appreciable quantity of minerals, growth factors and proteinaceous material which are favorable to the production of the antibiotic. Some of the grain mashes, as well as some whey concentrates, are sufficiently rich in protein that extra proteinaceous adjuncts need not be added to the medium. Of course, it is to be understood that various mixtures and combinations of the above carbon sources may be used.

Certain polyhydric alcohols, such as glycerol, are excellent assimilable carbon sources for the purposes of this invention and are particularly effective in increasing the yield of the antibiotic in the culture liquid.

A wide variety of proteinaceous materials may be used in the medium. Thus acid hydrolyzed casein, enzyme-hydrolyzed casein, distillers' grain slops, corn-steeping liquid, wheat-steeping liquor, whey or whey concentrates, soybean meal, acid hydrolyzed corn gluten, acid-hydrolyzed wheat gluten, peptone, offals, brewers' yeast and the like as well as synthetic mixtures of numerous amino acids may be used. These proteinaceous materials need not be supplied in a high degree of purity; the less pure materials which carry traces of growth factors and considerable quantities of mineral nutrients are suitable for use. A mixture of peptone or amino acids with distillers' residues such as distillers' grain slops or distillers' solubles is especially advantageous. Saline extracted hog stomach residue in combination with dried distillers' solubles and glycerol comprise the organic constituents of one of the preferred media of the invention.

The time required to obtain the maximum yield of the antibiotic in the nutrient medim varies with the method of cultivating the organism but, in general, the maximum yields are obtainable within two to fifteen days. In the case of aerated submerged cultures the maximum yield of product is usually obtained within two to seven days while about ten to twelve days are required in the case of surface cultures. However, in either case the pH of the nutrient medium should be maintained between about 6 and 8. A starting pH between about 6.8 and 7.2 has been found to be optimal for favoring rapid production of the antibiotic and hence is the preferred pH range.

The isolation of the pure crystalline antibiotic from the culture medium can be accomplished in a number of different ways. However, in general, the preferred process comprises clarifying the crude culture liquid below about pH 10; extracting the solution with an organic solvent having a solvent-water distribution coefficient for the antibiotic over about 9 such as cyclohexanone, butanol, ethyl acetate, amyl acetate, and methyl isobutyl ketone; removing the organic solvent from the extract; extracting the residue with an organic solvent having a solvent-water distribution coefficient for the antibiotic of between about 1 and 9 such as nitrobenzene, nitromethane, diethyl ether and ethylene dichdoride; washing the extract with dilute mineral acid and water or, alternatively, where a solvent such as a lower dialkyl ether (diethylether and the like) or ethylene dichloride has been used as the extraction solvent, passing the extract over an aluminum oxide type adsorption column; adding water to the organic solvent extract; evaporating the organic solvent from the mixture; extracting the aqueous solution with an organic fat solvent in which the antibotic is substantially insoluble such as benzene or petroleum ether; evaporating the aqueous solution to the point of crystallization and recovering the crystalline antibotic from the solution. When the acid extraction method is used, it is preferable to also extract the organic extract with a dilute alkali such as sodium bicarbonate in order to remove acidic impurities.

A modification of the above process consists in eliminating the first extraction of the clarified culture liquid with an organic solvent and the subsequent evaporation of the solvent from the extract. In this modified process the clarified culture liquid is extracted with an organic solvent having a solvent-water distribution coefficient for the antibiotic of between about 1 and 9 and the remainder of the process carried out as described above.

Another process which can be used to isolate the desired (1)-ψ-1-p-nitrophenyl-2-dichloroacetamidopropane-1,3-diol from the clarified culture liquid involves adsorbing the antibiotic on activated charcoal and eluting it with ether or 80% acetone. The antibiotic is isolated from the eluate by adding water, distilling off the organic solvent, removing any gumlike material which separates and concentrating the aqueous solution to the point of crystallization.

The invention is illustrated by the following examples.

Example 1

A mixture consisting of 180 g. of glycerol, 90 g. of peptone, 90 g. of dried distillers' grain slops, 90 g. of sodium chloride and sufficient distilled water to bring the volume to 18 liters is placed in a 30 liter glass stationary vat-type fermenter provided with a stainless steel head and propeller-type agitator. The fermenter also contains vertical baffle plates and, near the bottom, a perforated circular air diffusion ring.

The pH of the nutrient medium is adjusted to about 7.5 with sodium hydroxide solution and the fermenter placed in an autoclave. The fermenter and the medium are sterilized by steam at 120° C. for one hour, the fermenter cooled and then removed from the autoclave. The medium is inoculated with about 900 cc. of a shaken flask culture of *Streptomyces venezuelae*, prepared by inoculating 100 cc. portions of a sterile nutrient medium, such as that described above, with spores of the micro-organism and incubating the mixture in 500 cc. Erlenmeyer flasks on a revolving shaking machine for about seventy-two hours at room temperature.

After inoculation, the culture mixture is incubated at 24 to 25.5° C. for sixty-five to seventy hours. During the incubation sterile air is passed through the diffusion ring into the medium at the rate of 0.8 to 1 volume per volume of medium per minute and the agitator rotated at a speed of about 200 R. P. M.

The following table is illustrative of the antibiotic production obtained by the method described above.

| Incubation Period, Hours | Micrograms of Antibiotic per cc. of Culture Medium |
|---|---|
| 23 | 44 |
| 40 | 106 |
| 47 | 116 |
| 64 | 133 |
| 71 | 132 |

Example 2

A mixture consisting of 144 g. of maltose, 72 g. of distillers' solubles, 72 g. of hydrolyzed casein, 72 g. of sodium chloride and sufficient tap water to bring the volume to 14,400 cc. is adjusted to pH 7.5-7.7 with 10 N sodium hydroxide solution and dispensed in 300 cc. portions into forty-eight wide-mouth 1-liter Erlenmeyer flasks. The flasks are capped with two layers of gauze-cotton milk filter discs and the caps secured in place with spring clips. The flasks are placed in an autoclave and sterilized at 121° C. for 20 minutes. After cooling, the flasks are opened and seeded with 5 cc. per flask of a three-day old shaker flask culture of *Streptomyces venezuelae*. The inoculated flasks are capped and then incubated for three days at 22 to 24° C. on a rotary type shaking machine (150 R. P. M.; radius of circle, 2 inches). At the end of this time there are obtained 12 liters of a liquid culture at pH 7.39 containing 600 mg. of chloramphenicol. From this liquid, the antibiotic may be isolated by the methods hereinbefore set forth.

Example 3

A nutrient medium is prepared by adding sufficient distilled water to a mixture of 10 g. of maltose, 10 g. of corn steep liquor (30° Bé.), 2 g. of dipotassium phosphate and 5 g. of sodium chloride to make one liter of medium. After thorough mixing, 500 ml. aliquots are placed in 3 liter Fernbach flasks, the flasks plugged with cotton and the medium sterilized by autoclaving for twenty minutes at 250° F. After cooling to room temperature, each flask is inoculated with spores of *Streptomyces venezuelae* and the flasks incubated at 22 to 26° C. The incubation is continued for about 12 days at the end of which time a considerable amount of (1)-ψ-1-p-nitrophenyl-2-dichloroacetamidopropane-1.3-diol is present in the solution under the surface spore mat.

Example 4

A medium containing 10 g. of maltose, 5 g. of amino acids from acid hydrolyzed casein, 5 g. of dried distillers' solubles and 5 g. of sodium chloride is made up to a total volume of one liter with distilled water. After thorough mixing, the pH of the mixture is adjusted to between 7.4 and 7.7 by the addition of 10 N sodium hydroxide. 100 ml. aliquots are placed in 500 ml. Erlenmeyer flasks, the flasks plugged with cotton and sterilized by autoclaving for twenty minutes at 250° F. After cooling to room temperature each flask is inoculated with spores of *Streptomyces venezuelae* and the flasks incubated at 22 to 26° C. for about six days. During the incubation the flasks are placed on a revolving shaking machine which imparts a whirling motion to the liquid medium. The shaking table is rotated at about 150 R. P. M. Under these conditions the organism grows in a submerged state and produces more of the antibiotic in a shorter time than produced by the surface culture method described in Example 3.

Samples of the culture mixture are withdrawn at intervals for the determination of the antibiotic content by comparison with the crystalline antibiotic when assayed turbidimetrically against a broth culture of a strain of *Shigella paradysenteriae* Sonne. The results of these tests are comparable to those obtained from an average run and are shown in the following table.

| Incubation Period, Days | Micrograms of Antibiotic per cc. of Culture Liquid |
|---|---|
| 3 | 8 |
| 4 | 47 |
| 5 | 54 |
| 6 | 57 |

Example 5

A mixture consisting of 10 g. of glycerol, 5 g. of peptone, 5 g. of dried distillers' solubles and 5 g. of sodium chloride is taken up in enough distilled water to make one liter of medium. The pH of the medium is adjusted to a pH between 7.5 and 7.7 with 10 N sodium hydroxide and 100 ml. aliquots placed in 500 cc. Erlenmeyer flasks. The flasks are plugged with cotton and autoclaved for twenty minutes at 250° F. After cooling to room temperature, each flask is inoculated with spores of *Streptomyces venezuelae* and the flasks incubated on a revolving shaking machine as described in Example 2. The incubation is carried out at 22 to 26° C. for about six days. During this time the organism grows in the submerged state.

Samples of the mixture are withdrawn from time to time and analyzed as described in Example 4 for their antibiotic content. A typical analysis of a mixture prepared and incubated as described above is as follows.

| Incubation Period, Days | Micrograms of Antibiotic per cc. of Culture Liquid |
|---|---|
| 3 | 119 |
| 4 | 110 |
| 5 | 113 |
| 6 | 125 |

Example 6

3785 g. of maltose, 1893 g. of amino acids from acid hydrolyzed casein, 1893 g. of dried distillers' solubles, 1893 g. of sodium chloride and 1893 g. of calcium carbonate are placed in a 200 gallon horizontal aluminum rotary drum fermenter equipped with baffles so that the culture medium is spilled in thin sheets through the oxygen containing atmosphere in the upper portion of the rotating drum. Distilled water is added until the medium has a volume of 378.5 liters (100 gallons) and then the pH of the mixture adjusted to between 7.6 and 7.8 by the addition of 10 N sodium hydroxide solution. The medium is sterilized by heating it for one hour at 250° F. After cooling to room temperature the medium which has a pH of 6.7 is inoculated with spores of *Streptomyces venezuelae* and the mixture incubated at 74° F. for one hundred and sixteen hours. During the incubation the fermenter is revolved at a rate of about 15 R. P. M. and air is passed into the central zone of the fermenter at the rate of 13 cubic feet per minute, the vent valve being set to maintain a positive pressure in the fermenter of about 7 lbs. per sq. inch.

Samples of the culture mixtures are withdrawn from time to time and assayed for antibiotic content. A typical analysis from one such run is shown in the table below.

| Incubation Period, Hours | Micrograms of Antibiotic per cc. of Culture Liquid |
|---|---|
| 68 | 43 |
| 80 | 59 |
| 92 | 56 |
| 104 | 62 |
| 116 | 57 |

Example 7

A sterilized nutrient medium, consisting of 1.5 gallons of glycerol, 6.3 pounds of dried saline extracted hog stomach residue, 1.5 gallons of molasses, 6.3 pounds of sodium chloride, water to make 150 gallons and sufficient strong sodium hydroxide solution to adjust the pH from 6.8 to 7.2, in a 200 gallon, steel, vertical vat-type fermenter is inoculated with 15 gallons of a forty-eight hour vegetative culture grown in a 30-gallon, stainless steel, vertical vat-type fermenter previously inoculated with spores of *Streptomyces venezuelae*. The fermenter used should preferably be equipped with a water jacket for control of the temperature, a turbine type impeller for mechanical agitation and a ring sparger near the bottom of the vessel for the introduction of sterile air into the medium.

The mixture is incubated at 23 to 24° C. for four days, during which time the stirrer is revolved at the rate of 180 R. P. M. and sterile air is supplied to the medium through the ring sparger at the rate of 7 cubic feet per minute. Analysis of a portion of the culture liquid at the end of the incubation period shows the culture liquid to contain 118 micrograms of (1)-$\psi$-1-p-nitrophenyl-2-dichloroacetamidopropane-1,3-diol per cc.

Example 8

A nutrient medium, consisting of 15 gallons of glycerol, 63 pounds of hydrolyzed soy bean protein, 63 pounds of dried distillers' solubles, 63 pounds of sodium chloride, sufficient strong sodium hydroxide solution to give a post-sterilization hydrion concentration of pH 6.8 to 7.2 and water to make 1500 gallons, is prepared in a 2000 gallon, steel, vertical vat-type fermenter equipped with a turbine type impeller for mechanical agitation, a ring sparger for the introducing of sterile air into the medium and an internal coil for temperature control. The medium is sterilized by heating with steam under pressure and cooled. The nutrient medium is inoculated with 150 gallons of a forty-eight hour vegetative culture grown in a 200 gallon, steel, vertical vat-type fermenter previously inoculated with 15 gallons of a forty-eight hour vegetative culture grown in a 30 gallon, stainless steel, vertical vat-type fermenter previously inoculated with spores of *Streptomyces venezuelae*. The culture in the 2000 gallon fermenter is incubated at 23-4° C. for four days. During the incubation the impeller is revolved at the rate of 120 R. P. M. and sterile air passed into the medium at the rate of 60 cubic feet per minute. Analysis of a portion of the culture liquid at the end of the incubation period shows the culture liquid to contain 89 micrograms of (1)-$\psi$-1-p-nitrophenyl-2-dichloroacetamidopropane-1,3-diol per cc.

Example 9

A nutrient medium, consisting of 12 gallons of glycerol, 50.5 pounds of dried saline extracted hog stomach residue, 50.5 pounds of dried distillers' solubles, 50.5 pounds of sodium chloride, sufficient strong sodium hydroxide solution to give a post-sterilization pH of 6.8 and water to make 1200 gallons, is prepared in a 2000 gallon, glass-lined, vertical vat-type fermenter equipped with a mechanical stirrer and jets near the bottom of the vessel for the introduction of sterile air into the medium. The medium is sterilized by heating with steam under pressure and cooled. The nutrient medium is inoculated with spores of *Streptomyces venezuelae* and incubated at 26° C.

for one hundred and forty-seven hours. During the incubation the stirrer is revolved at the rate of 120 R. P. M. and sterile air is passed into the medium through the jets near the bottom of the vessel at the rate of 80 cubic feet per minute.

Samples of the culture mixture are withdrawn from time to time during the incubation period and assayed for antibiotic content. A typical analysis from one such run is shown in the table below.

| Incubation Period, Hours | Micrograms of Antibiotic per cc. of Culture Liquid |
|---|---|
| 103 | 23 |
| 115 | 54 |
| 127 | 65 |
| 139 | 65 |
| 147 | 77 |

What we claim is:

1. In a process for obtaining chloramphenicol, the step which comprises cultivating *Streptomyces venezuelae* in contact with an aqueous nutrient medium under aerobic conditions at a temperature of about 20 to 40° C. for about two to fifteen days.

2. In a process for producing chloramphenicol, the step which comprises cultivating *Streptomyces venezuelae* in contact with an aqueous nutrient medium containing a proteinaceous material and a source of assimilable carbon.

3. In a process for producing chloramphenicol, the step which comprises cultivating *Streptomyces venezuelae* under aerobic conditions in a submerged state in an aqueous nutrient medium containing a proteinaceous material and a source of assimilable carbon.

4. In a process for producing chloramphenicol, the step which comprises cultivating *Streptomyces venezuelae* under aerobic conditions in contact with an aqueous nutrient medium containing a proteinaceous material and a polyhydric alcohol.

5. In a process for producing chloramphenicol, the step which comprises cultivating *Streptomyces venezuelae* under aerobic conditions in a submerged state in an aqueous nutrient medium containing a proteinaceous material and a polyhydric alcohol.

6. In a process for producing chloramphenicol, the step which comprises cultivating *Streptomyces venezuelae* under aerobic conditions in contact with an aqueous nutrient medium containing a proteinaceous material and glycerol.

7. In a process for producing chloramphenicol, the step which comprises cultivating *Streptomyces venezuelae* under aerobic conditions in a submerged state in an aqueous nutrient medium containing a proteinaceous material and glycerol.

8. In a process for producing chloramphenicol, the step which comprises cultivating *Streptomyces venezuelae* under aerobic conditions in an aqueous nutrient medium containing distillers' solubles, peptone and glycerol.

9. In a process for producing chloramphenicol, the step which comprises cultivating *Streptomyces venezuelae* under aerobic conditions in an aqueous nutrient medium containing distillers' solubles, amino acids and glycerol.

10. In a process for producing chloramphenicol, the step which comprises cultivating *Streptomyces venezuelae* under aerobic conditions in an aqueous nutrient medium containing distillers' solubles, saline extracted hog stomach residue and glycerol.

11. In a process for producing chloramphenicol, the step which comprises cultivating *Streptomyces venezuelae* in contact with a nutrient medium at a suitable incubation temperature and for a suitable period of cultivation to form chloramphenicol in said medium.

12. In a process for producing chloramphenicol, the steps which comprise cultivating *Streptomyces venezuelae* in contact with an aqueous liquid nutrient medium at a suitable incubation temperature and for a suitable period of cultivation to form chloramphenicol in said liquid medium and separating undissolved solid matter from the liquid thereby obtaining a solution containing chloramphenicol.

13. In a process for producing chloramphenicol, the steps of inoculating an aqueous liquid nutrient medium containing a proteinaceous material and a source of assimilable carbon with *Streptomyces venezuelae*, incubating the inoculated medium at a temperature of 20 to 40° C. for two to fifteen days, agitating said medium and introducing sterile air thereinto thereby developing discrete particles dispersed throughout said liquid medium and separating undissolved solid matter from the liquid after said incubation period thereby obtaining the aqueous medium with a high concentration of chloramphenicol therein.

JOHN EHRLICH.
ROBERT M. SMITH.
MILDRED A. PENNER.

REFERENCES CITED

The following references are of record in the file of this patent:

UNITED STATES PATENTS

| Number | Name | Date |
|---|---|---|
| 1,865,880 | Oberlin | July 5, 1932 |
| 2,103,266 | Lott | Dec. 28, 1937 |

OTHER REFERENCES

Waksman, Proc. Staff Meetings of the Mayo Clinic, Sept. 20, 1944, pages 537 to 548.

Science, October 31, 1947, vol. 106, pages 417, 418.

Science News Letter for July 17, 1948, page 34.